S. S. RUSSELL.
QUILTING FRAME.
APPLICATION FILED JAN. 14, 1909.
940,070.  Patented Nov. 16, 1909.
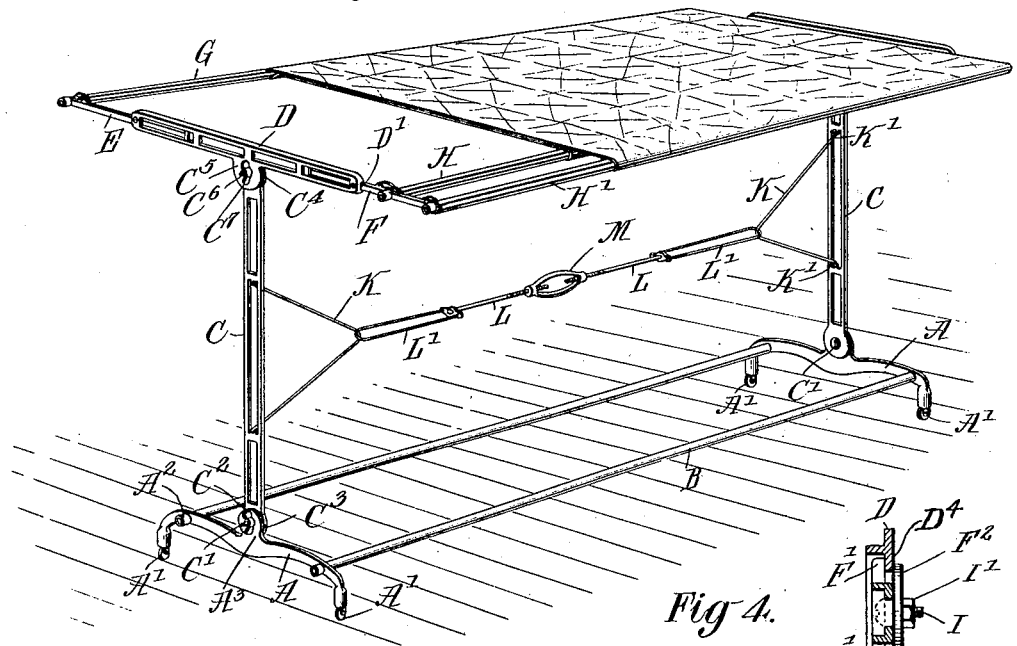
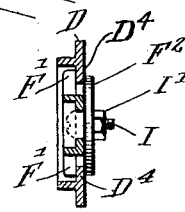
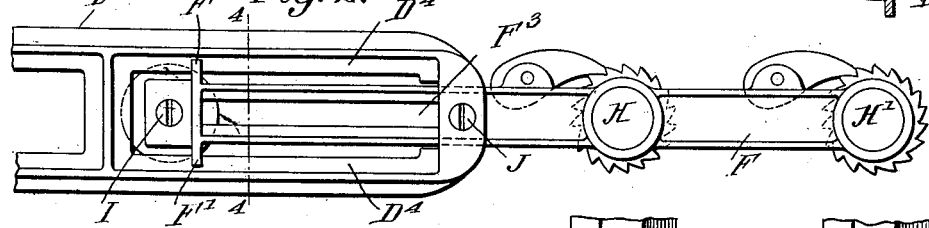
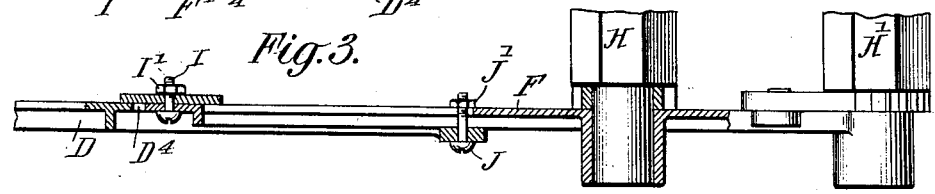
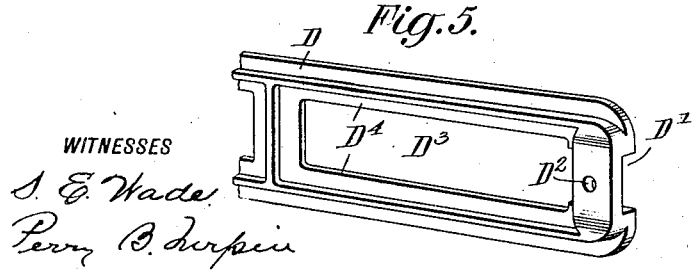
WITNESSES
J. E. Wade
Perry B. Turpin
INVENTOR
SIDNEY S. RUSSELL.
BY Munn & Co.
ATTORNEYS

UNITED STATES PATENT OFFICE.

SIDNEY SIBBIE RUSSELL, OF COLUMBIA, SOUTH CAROLINA.

QUILTING-FRAME.

940,070.

Specification of Letters Patent.

Patented Nov. 16, 1909.

Application filed January 14, 1909. Serial No. 472,196.

*To all whom it may concern:*

Be it known that I, SIDNEY SIBBIE RUSSELL, a citizen of the United States, and a resident of Columbia, in the county of Richland and State of South Carolina, have made certain new and useful Improvements in Quilting-Frames, of which the following is a specification.

This invention is an improvement in quilting frames, and particularly in folding quilting frames, and the invention consists in certain novel constructions and combinations of parts as will be hereinafter described and claimed.

In the drawing—Figure 1 is a perspective view of a frame as in use. Fig. 2 is a detail side elevation of a portion of one end of the top frame. Fig. 3 is a plan view, partly in section of the part shown in Fig. 2. Fig. 4 is a detail cross section on about line 4—4 of Fig. 2, and Fig. 5 is a detail perspective view of one end of one of the main bars of the top frame.

In carrying out my invention I employ a base having end portions A, mounted on rollers A', and connected by cross bars B, which may be tenoned at their ends to fit in socket pieces $A^2$, provided in the end sections, as will be understood from Fig. 1, so the base may be taken apart if desired. The end sections A of the base are provided with serrated plates $A^3$, which coöperate with mating serrated plates $C^3$ at the lower ends of the standards C, so the standards and the base may be secured in any desired relation by means of the screws C', and wing nuts $C^2$ thereon as will be understood from Fig. 1 of the drawing. At their upper ends the uprights C, have similar serrated plates $C^4$, which coöperate with the serrated plates $C^5$, screws $C^6$, and wing nuts $C^7$ in securing the main bars D of the top frame in any suitable adjustment, or the uprights may be adjusted by the connection of their lower ends with the base to regulate the height of the top frame and then the said top frame may be adjusted with its connections at the upper end of the uprights to properly level the top frame or to adjust the said frame to any desired angle that may be desired in the use of the invention.

The top frame comprises the main bars D, and the extension bars E and F, the bars E carrying one roller G, and the bars F the rollers H and H', whose ends may be provided with suitable ratchet mechanism to permit them to be wound and held in any desired position. The extension bars are slidable relatively to the main bars, and means are provided for securing them in any desired adjustment and to permit them to slide in adjusting relatively to the main bars, and this construction is best shown in Figs. 2, 3 and 4 of the drawing.

In the construction shown, the main bars D are each provided at their ends in one face with a groove D', in which the respective extension bars may slide, and the base wall of this groove has a bolt hole $D^2$, and the bar D has an opening $D^3$ extending longitudinally and adapted to permit the movement of the overlapping devices at the inner end of the extension bar. As shown, these overlapping devices include lugs F', which slide along one side of each rail $D^4$ at the margins of the opening $D^3$, and a washer $F^2$ sliding along the opposite side of the rail $D^4$ is held to the extension bar by the bolt I, and the nut I'. The extension bar is also slotted longitudinally at $F^3$ for the passage of the bolt J, which passes through the opening $D^2$ in the base wall of the groove D' and operates to hold the extension bar in connection with the main bar and yet permit the sliding of the parts relatively when it is desired to adjust the same. In the operation of this construction, by slacking the nuts on the bolts I and J the extension bars may be moved in or out as desired, and then secured in adjustment by tightening the nuts I' and J', as will be understood from Figs. 1, 2 and 3 of the drawing.

In bracing and steadying the quilting frame, I provide double armed yokes K, having at their ends hooks K' to detachably engage with the uprights C and the yokes K are engaged between their ends by loops L' at the ends of the threaded rods L, which latter are connected by a turn buckle M, which may be operated to draw the uprights toward each other in order to securely brace the frame when in use.

It will be noticed that the bracing construction K, L and M may be quickly detached, and that the several other parts of the quilting frame may be separated when desired for convenience in storage and shipment.

I claim—

1. In a quilting frame substantially as herein described, the combination of the top frame main bars having grooves in their faces and longitudinal openings adjacent said grooves, extension bars having lugs at their inner ends overlapping the walls of the openings in the main bars on one side and also having portions projecting into said openings, washers on the sides of the main bars opposite said lugs, bolts connecting said overlapping devices, bolts projecting through the base walls of the grooves in the main bars, the extension bars being slotted longitudinally for the passage of said bolts, and work supporting means carried by the extension bars, substantially as and for the purposes set forth.

2. The combination in a quilting frame of main bars having longitudinal grooves, and longitudinal slots adjacent said grooves, extension bars slidable in said grooves and having lugs at their inner ends overlapping the walls of the slots in the main bars on one side of the latter, and also having portions projecting into said slots, washers on the sides of the main bars opposite said lugs, bolts connecting said overlapping devices, and work supporting devices carried by the extension bars, substantially as set forth.

SIDNEY SIBBIE RUSSELL.

Witnesses:
  WASHINGTON CLARK,
  G. P. LOGAN.